United States Patent [19]

Fields

[11] Patent Number: 5,730,452
[45] Date of Patent: Mar. 24, 1998

[54] COLLAPSIBLE CART

[76] Inventor: Rufus Fields, 5013 Bolden Rd. Rte 8, Claremore, Okla. 74017

[21] Appl. No.: 541,601

[22] Filed: Oct. 10, 1995

[51] Int. Cl.⁶ ....................................................... B62B 3/02
[52] U.S. Cl. .............................. 280/47.35; 280/47.33; 280/79.3; 280/47.19; 280/654; 108/179; 211/130.1; 211/201
[58] Field of Search ........................ 211/130, 133, 211/149, 201, 202, 150, 151; 108/162, 178, 179; 280/47.35, 47.36, 47.371, 47.33, 79.3, 47.19, 651, 654, 47.16, 47.131

[56] References Cited

U.S. PATENT DOCUMENTS

| | | | |
|---|---|---|---|
| 1,262,361 | 4/1918 | Lafferty | 280/651 |
| 1,955,769 | 4/1934 | Reynolds | 211/130 |
| 1,961,394 | 6/1934 | Rothe | 211/130 |
| 2,584,489 | 2/1952 | Morrison | 211/142 |
| 2,720,402 | 10/1955 | De Puy et al | 280/41 |
| 3,052,484 | 9/1962 | Huffman et al | 280/36 |
| 3,074,734 | 1/1963 | Munson et al | 280/41 |
| 3,272,528 | 9/1966 | Young et al | 280/33.99 |
| 3,361,302 | 1/1968 | Berger | 280/47.16 |
| 3,981,511 | 9/1976 | Foster | 280/79.3 |
| 4,074,826 | 2/1978 | Lewanoni | 220/6 |
| 4,793,497 | 12/1988 | Hall et al. | 280/79.3 |
| 4,923,202 | 5/1990 | Breveglieri et al | 280/47.35 |
| 5,192,092 | 3/1993 | DiBenedetto | 280/654 |

Primary Examiner—Brian L. Johnson
Assistant Examiner—Avraham Lerner
Attorney, Agent, or Firm—John D. Gassett

[57] ABSTRACT

A collapsible cart basically for serving food. A ground support assembly includes an axle with a wheel at each end and a caster cross-bar perpendicular to the axle with a caster at each end which provides great stability. Two sets of three parallel vertical bars are pivotally supported from the axle. One set is near the outer end and another set at the other end of the axle. Shelves are supported between the two sets at spaced intervals by pivots on each vertical bar such that each shelf is in a horizontal position throughout the range of rotation of the vertical bar about its pivot.

10 Claims, 6 Drawing Sheets

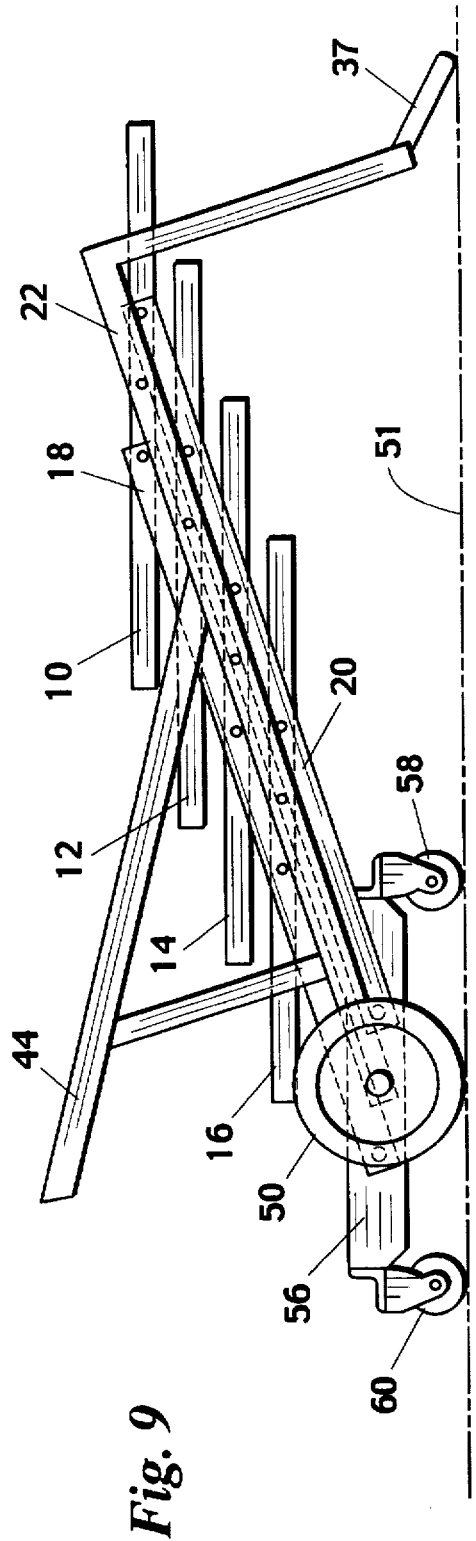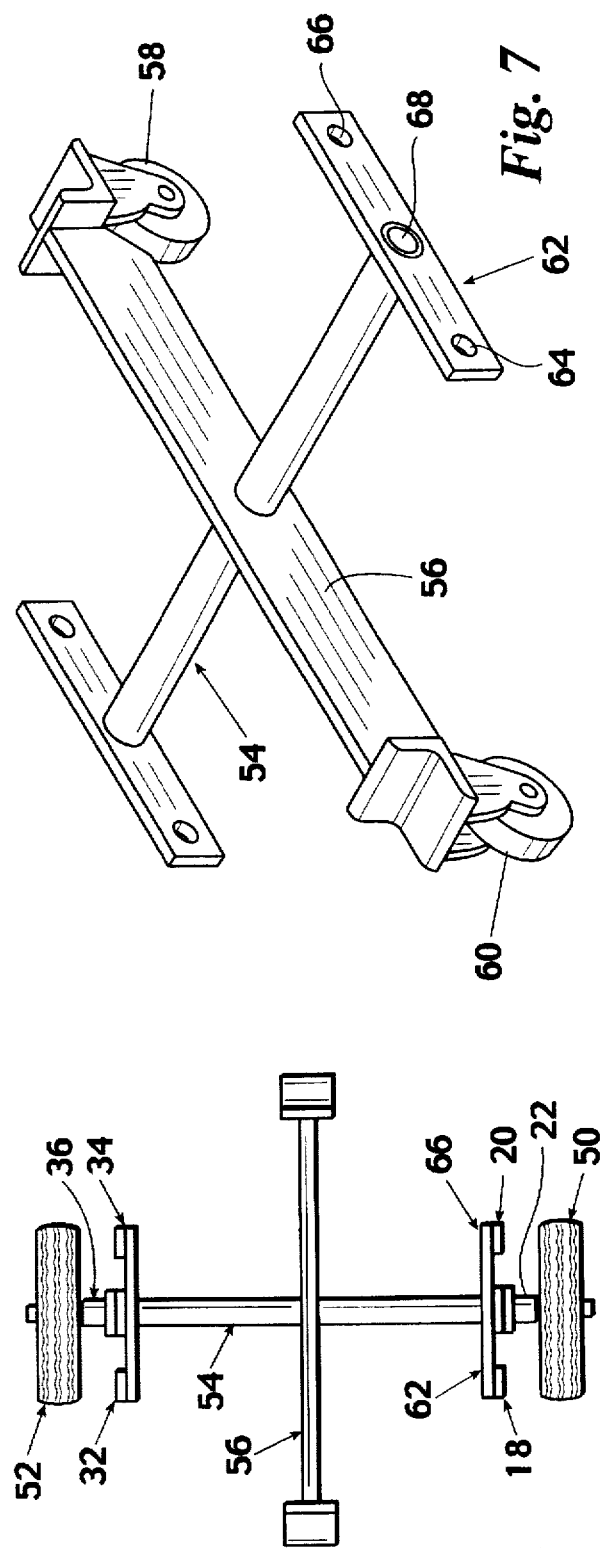

COLLAPSIBLE CART

BACKGROUND OF THE INVENTION

1. Field of the Invention

This invention relates to a wheel supported cart having multiple trays, one under the other, which may be used for transporting meals in plates or other containers, or for other purposes.

2. Background of the Invention

There are many carts commercially available for hauling or transporting various articles. One such cart is described in U.S. Pat. No. 3,074,734 which relates to improvements in serving carts of the multiple tray type such as used primarily for the transport and service of food and beverages. A typical prior art cart includes a shaft(s) supported by two or four wheels and can carry various articles. None appear to be widely used in restaurants.

It is therefore an object of this invention to provide a new and improved construction for a serving cart for serving food which is user friendly.

It is another object of this invention to provide a stable multiple tray serving cart in which the trays remain horizontal from the tray loaded position to its collapsed position.

SUMMARY OF THE INVENTION

This invention is primarily a food serving cart having multiple trays, one above the other. I shall first describe the support wheels and associated structure. A horizontal axle connects two spaced apart wheels which are rotatably attached at each end of the axle. A caster cross-bar is perpendicular to and fixed to the axle intermediate its ends. At each end of the caster cross-bar is a caster. A horizontal support bar is fixed to the axle at each end near the wheel.

Each side of my cart is provided with a shelf support assembly. Each side assembly includes three spaced apart vertical-like tray support bars, i.e. a front, center, and rear. The lower end of these front and rear tray support bars are pivotally mounted on the ends of the horizontal support bar. The lower end of the center bar is supported between the front and rear pivot support bars. This center bar is pivotally connected at its lower end to the horizontal support bar or to the axle. Preferably the axis of the center support bar pivot lies on the axis of the axle. These pivot support bars support shelves or trays which are stacked but spaced one below or above the other when the cart is in upright position. Each shelf is pivotally attached to each pivot support bar. The center support bar is provided with a handle which extends out toward the rear of the cart. When it is desired to raise or lower or collapse the cart, one either rotates the handle forward or to the rear. The horizontal support bar is fixed to the axle of the wheel and stays in a horizontal position. Thus, as the handle is pulled backwards, the two side support bars and the center support bar become closer together. However, the shelves always remain horizontal. The forward and rear casters which are connected on the caster cross-bar which is perpendicular to the axle of the wheels prevent the horizontal pivot support bar from deviating substantially from the horizontal position. This permits the action of the trays just described.

There is also a forward stop which is a bar connected to the center bar at an angle thereto toward the front and is designed to contact the floor to limit the rotating of the center bar and side bars about the horizontal support bar. There is also a rear stop which is a bar connected to the center bar at an angle and slopes toward the rear and is also designed to contact the floor when the handle is rotated a pre-designed amount to stop the rotation.

The casters also give the cart stability when it is being moved.

It is an object of this invention to provide a serving cart in which the shelves are essentially the same size and in which the cart is easy to move and has great stability. Other objects and a better understanding of the invention can be had from the detailed description and drawings in which:

BRIEF DESCRIPTION OF THE DRAWINGS

FIG. 6 is a top view of the main support wheels, two casters, and their connection to the vertical shelf support bars.

FIG. 7 is a perspective view of support axle, support bar, and casters.

FIG. 9 is similar to FIG. 4 except the cart is in the most rear position and rear stop has been removed.

DETAILED DESCRIPTION OF THE INVENTION

Figure 1:
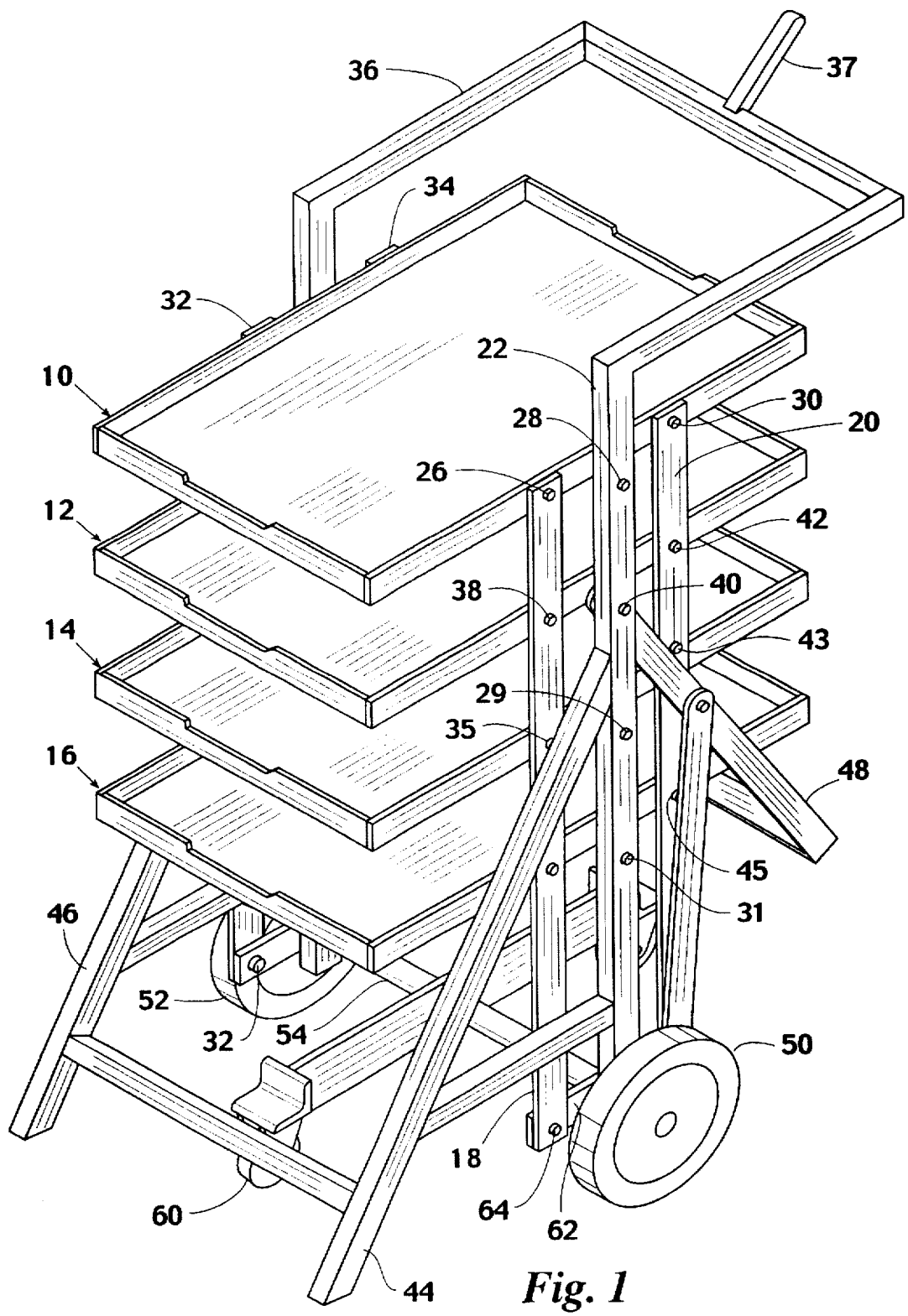
FIG. 1 is a perspective view of the collapsible cart.

Attention is first directed to FIG. 1 which is a perspective view of the collapsible cart. There are shown four horizontal shelves 10, 12, 14, and 16. These may be the type in which each will hold a serving plate or product to be served. Each such shelf is supported by two side shelf support assemblies. This assembly includes a forward shelf support bar 18, a rear support bar 20, and center shelf support bar 22. Shelf 10 is supported from shelf support bar 18, rear shelf support bar 20, and center support bar 22 by pivots 26, 28, and 30 having substantially horizontal axis. Similarly, support bars 32, 34, and 36 are on the other side of the shelves to make up the second side shelf support assembly. Each shelf is supported by a pivot 26, 28, and 30 on the front side and similar pivots on support bars 32, 34, and 36 on the rear side as indicated. In other words, the cart is symmetrical. Shelf 12 is thus supported by pivot 38, 40, and 42 from the forward shelf support bar, the center shelf support bar, and the rear shelf support bar. This pivoted connection to these bars occur for each shelf which may be used. There are four shelves shown, but any practical number of shelves can be used. All shelf pivots on each front, center, and rear support bars are aligned. For example, shelf pivots 30, 42, 43, and 45 on rear bar are shown aligned. Similarly, pivots 28, 29, 31, 40 on center bar 22 and pivots 26, 38, 35, etc. on front bar 18 are also clearly shown aligned.

A forward stop frame includes a stop bar 44 which is attached to shelf center support bar 22 and a stop bar 46 which is connected to center shelf support bar 36. Similarly, a rear stop 48 is supported from the rear side of the center support bar 22 and is used to limit the rearward pivot of the cart.

Figure 3:
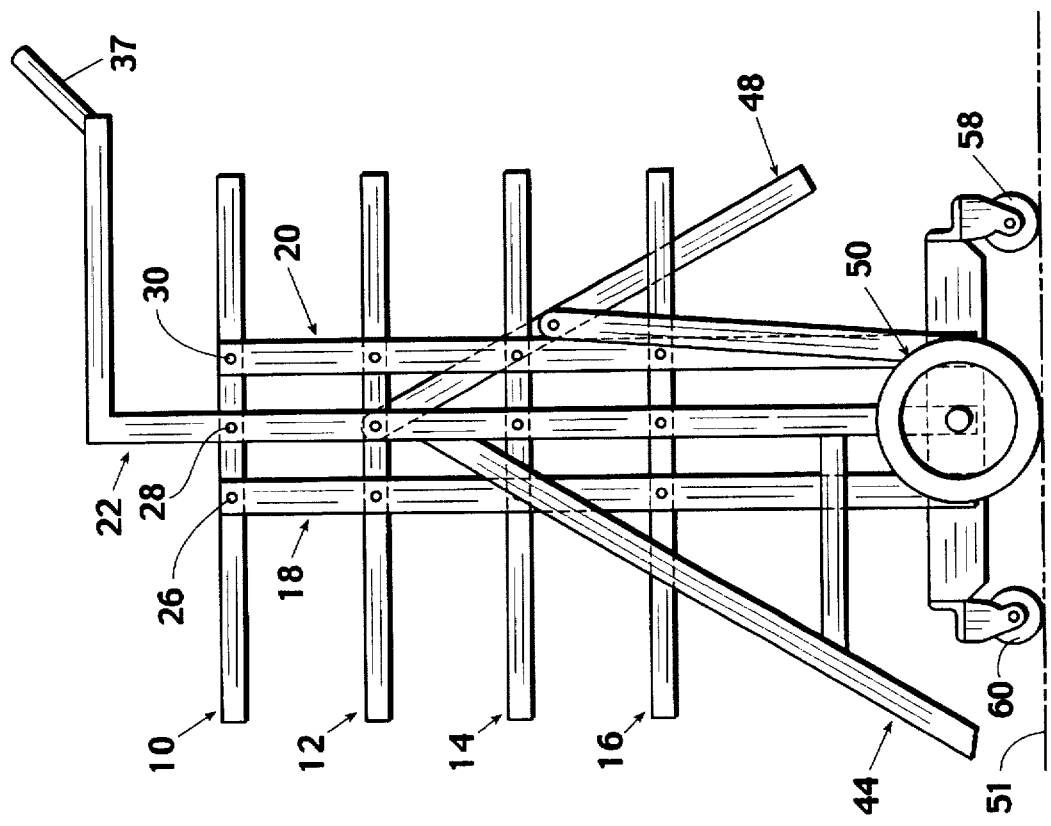
FIG. 3 is similar to FIG. 2 except that support casters have been added.
Figure 8:
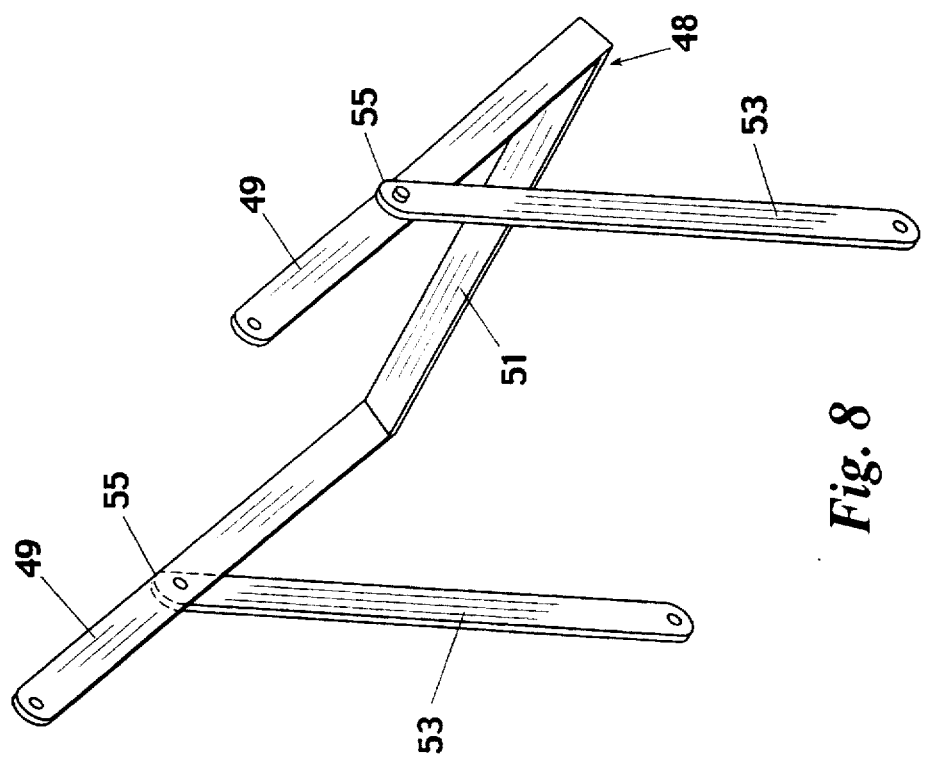
FIG. 8 is a perspective view of the rear stop.

Attention is now directed to FIG. 8 which shows the rear stop 48 in isolation. The main frame is U-shaped and includes two upright members 49 and a base 51. Two pivot bars 53 are pivoted at 55 to upright members 49. As shown in FIG. 3, the lower end of pivot bars 53 are pivotally attached to bar 62.

I will now discuss the main support wheels and supporting structure. As can be seen perhaps more clearly in FIGS. 6 and 7 than in FIG. 1, main support wheels 50 and 52 are supported from axle 54. Wheels 50 and 52 are rotatably supported from the ends of axle 54. A caster bar 56 is fixed to axle 54 at about the mid-point and is fixed in a perpendicular position thereto. Caster bar 56 supports a rear caster 58 and a forward caster 60. A pivot support bar 62 is fixed to axle 54 at each end thereof just inside wheels 50 and 52.

The lower end of forward shelf support bar 18 is pivotally supported from pivot support bar 52 by pivot 64. Rear shelf support bar 20 is supported from pivot support bar 62 by pivot 66. Center shelf support bar 22 is supported from pivot support bar 62 or axle 54 by pivot 68. This could be supported from axle 54 inasmuch as axle 54 is fixed to pivot support bar 62. The axis of horizontal pivots 64, 66, and 68 are parallel to each other and also to the axis of axle 54. The upper end of center shelf support bars 22 and 36 merge into handle 37.

Figure 2:
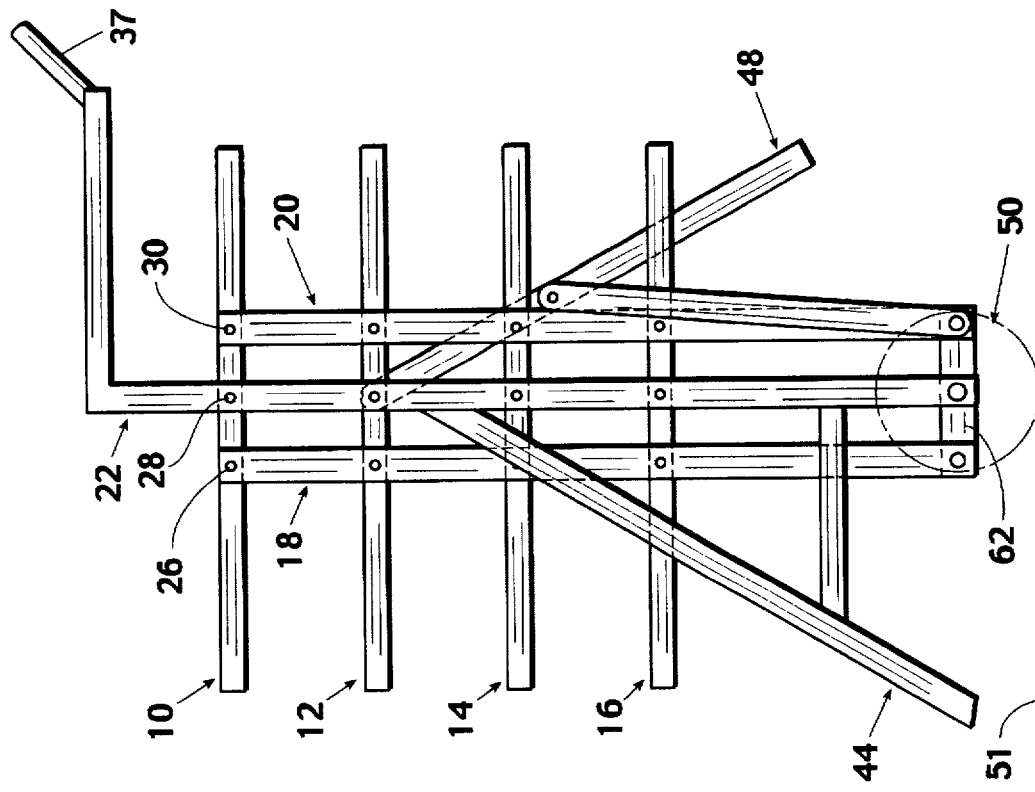
FIG. 2 illustrates a side view of the cart illustrating only the shelves and the supporting bars, stops, and wheel.

FIG. 2 primarily shows a side view of the shelves 10, 12, 14, and 16 and the forward shelf support bar 18, center shelf support bar 22 and rear shelf support bar 20, as well as the pivot support bar 62 in order to more clearly show their relationship to each other. Forward stop 44 and rear stop 48 are also shown.

FIG. 3 is similar to FIG. 2 except main support wheels 50 and casters 58, 60 have been added. It is a side view of the cart of this invention in its most upright position. It is noted that the shelves 10, 12, 14, and 16 are parallel and horizontal. Each shelf remains horizontal throughout rotation from its foremost forward position (FIG. 4) to its foremost rear position shown in FIG. 5. This is permitted by the structural parallel arrangements of bars 18, 20, and center shelf support bar 22 from the pivot support bar 62, axle 54 and the pivots of the shelves.

Figure 4:
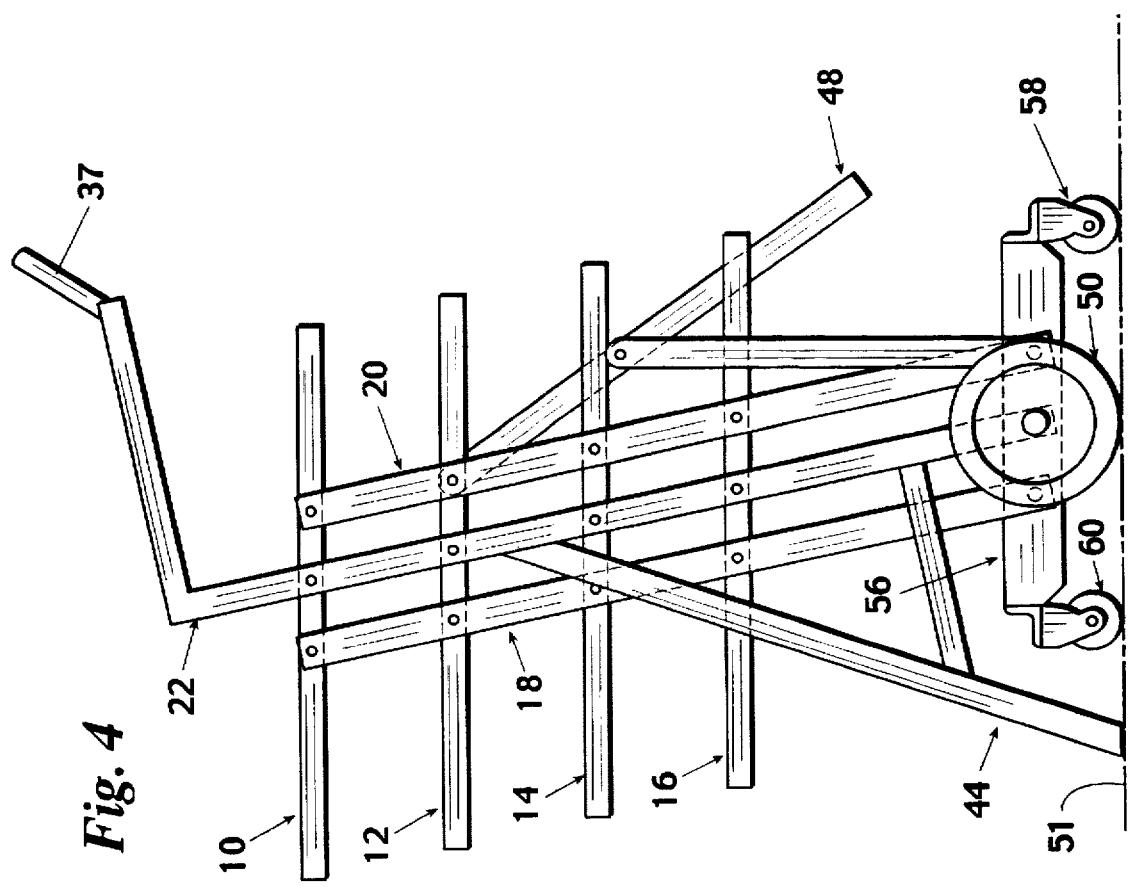
FIG. 4 is similar to FIG. 3 except that the cart is in its most forward position.

In FIG. 4 the cart is shown in its most forward position with the stop 44 resting on the ground or floor 51.

Figure 5:
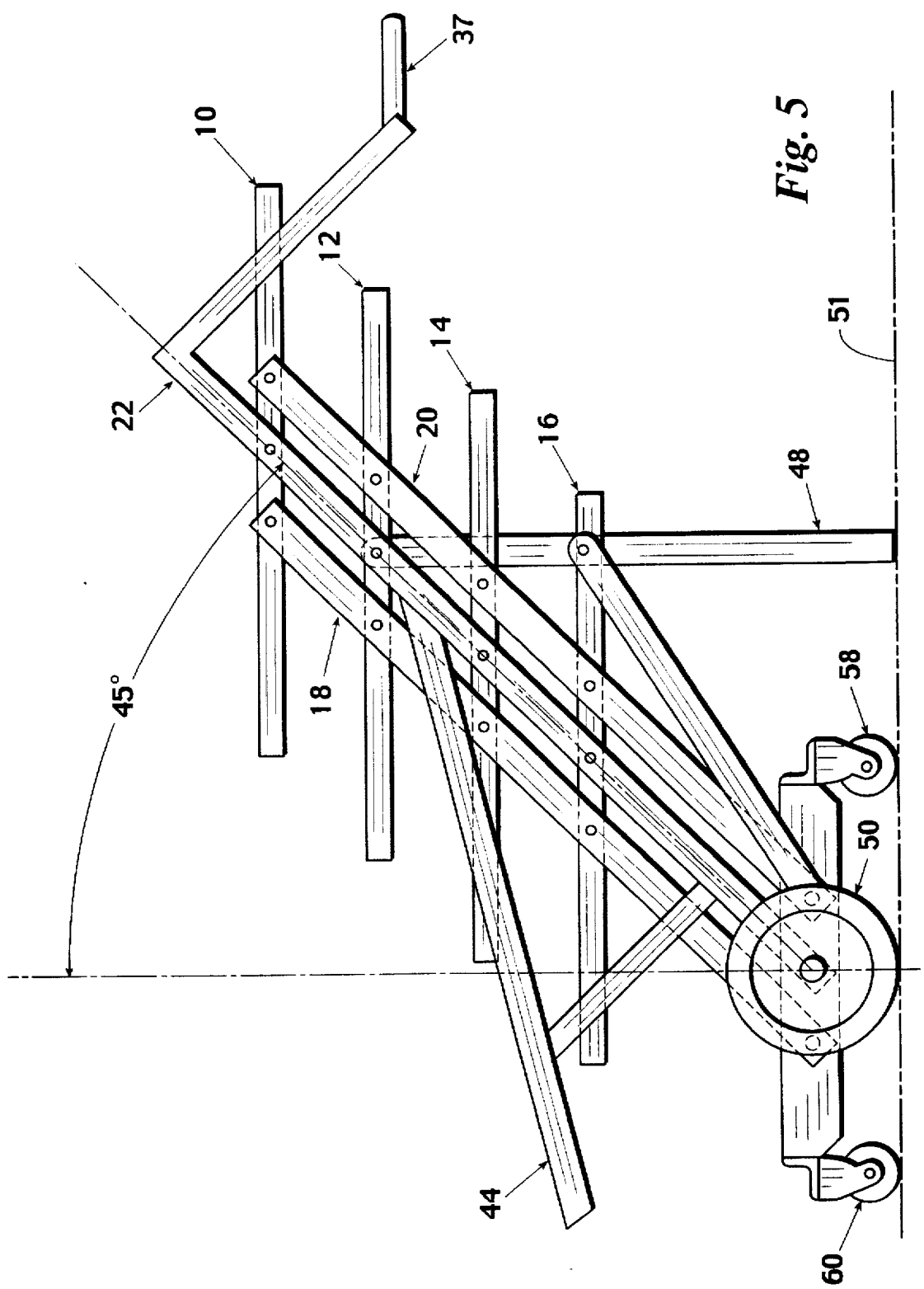
FIG. 5 is similar to FIG. 4 except that the cart has reclined to the rear to its most rearward rotation and stopped by the rear stop.
Figure 10:
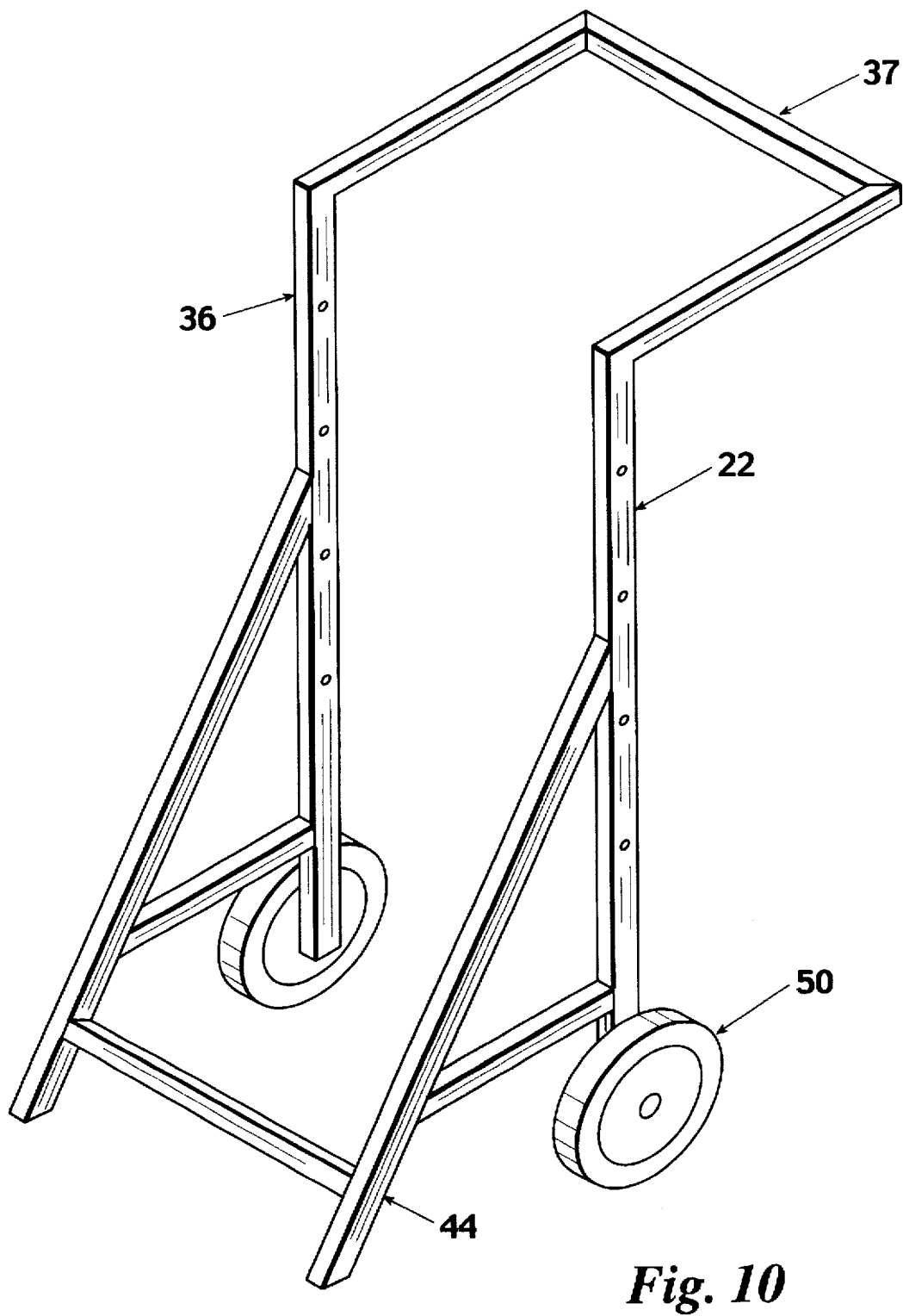
FIG. 10 is a perspective view of the main support frame.

FIG. 5 is rearmost where the rear stop 48 is rested on the floor 51. Rear and forward casters 58 and 60 give the cart stability and maintain pivot support bar 62 in a horizontal position for all the positions of the cart, from the forwardmost position shown in FIG. 4 to the lowermost position shown in FIG. 5.

FIG. 9 shows the cart with rear stop 48 removed. Here the rearward rotation is stopped by handle 37.

By way of example and not by limitation, typical dimensions for some of the key components of this invention for a cart which has been built include 7" diameter wheels 50, 52; pivot support bar 62 being 16" long; axle 54 being about 22" long and ½" pipe; vertical length of the forward and rearward shelf support bars 18 and 20 are about 32". When in upright position, stop 44 attaches to center support bar 22 about 38" above floor 51 and makes an angle therewith of about 5". Likewise, stop 48 attaches to support bar 22 about 26" above floor 51 and makes an angle of about 5°. When in the position shown in FIG. 3, forward stop 44 is about 5" off the floor 51, and rear stop 48 is about 12" off the floor. This permits the cart to be shoved along when it is in its general position shown in FIG. 3. The shelves are typically about 14" by 24".

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A collapsible cart which comprises:
   (a) at least a first shelf and a second shelf;
   (b) a support wheel assembly including:
      (i) an axle
      (ii) a wheel at each end of said axle
      (iii) a caster cross-bar supported from said axle,
      (iv) a caster at each end of said cross-bar;
   (c) a pivot support bar supported by said axle;
   (d) a first and a second side shelf support assembly, each assembly having at least two parallel shelf support bars, each bar at a lower end supported from and rotatable about a pivot on said pivot support bar,
   (e) each side of each shelf pivotally supported from one of said parallel shelf support bars such that as each said shelf support bar rotates about its pivot said shelves move closer together while remaining parallel to each other and parallel to a plane defined by said axle and said cross bar.

2. A cart as defined in claim 1 including a handle attached to one of said shelf support bars.

3. A cart as defined in claim 1 in which said caster cross-bar is located mid-way between the ends of said axle and is perpendicular thereto.

4. A cart as defined in claim 3 including a handle attached to a shelf support bar.

5. A collapsible cart for holding a plurality of trays which comprises:
   an axle;
   a wheel rotatably mounted on each end of said axle;
   a cross-bar fixed to said axle intermediate the ends thereof and extending on either side;
   a caster on each end of said cross-bar;
   a pivot support bar near each end of said axle and fixed thereto and extending on each said of said axle;
   a first side and a second side support bar assembly, each side having a rear, a center, and a forward upright shelf support bar, each such rear and forward bar pivotally attached at the lower end thereof to said support bar and with the center support bar pivotally supported at said axle;
   at least one shelf having two ends and two sides, the side of each shelf pivotally attached to each side assembly at one point on each rear, center, and forward support bar.

6. A collapsible cart which comprises:
   at least a first shelf and a second shelf;
   a support wheel assembly, including;
      an axle,
      a wheel at each end of said axle,
      a caster cross-bar supported from said axle,
      a caster at each end of said cross-bar;
   a first and a second side shelf support assembly, each assembly having parallel front, rear, and center shelf support bar, each pivotally supported by a pivot support bar supported at its lower end from said axle;

each shelf pivotally supported from each said parallel front, rear, and center shelf support bar;

a front stop fixed to said inner shelf support bar such that when said side assemblies are in a vertical position, said front stop clears the ground but when the side assemblies are moved forward a selected amount, the stop will prevent further forward rotation.

7. A cart as defined in claim 6 including a rear stop member fixed at an angle to said center shelf support bar and being above the plane defined by the lower point on said wheels and casters but when rotated a selected amount to the rear, said stop contacts said plane and stops the rear rotation of said cart about the axle of said wheels.

8. A cart as defined in claim 6 including a pivot support bar attached to said axle and a rear stop which is a U-shaped member with two upright legs, the upper end of each said upright leg pivotally attached to said side assembly, and an arm pivotally attached at one end to a point intermediate the ends of one of said upright legs and the other end pivotally supported from said pivot support bar.

9. A collapsible cart which comprises:

at least a first shelf and a second shelf;

a support wheel assembly including;
an axle,
a wheel at each end of said axle,
a caster cross-bar supported from said axle,
a caster at each end of said cross-bar;
a pivot support bar supported from said axle;

a first and a second side shelf support assembly, each assembly having parallel first and second shelf support bar, each pivotally supported at a lower end from said pivot support bar supported from said axle;

each shelf is pivotally supported from each said first and second shelf support bar;

a front stop supported from one of said shelf support bar such that when said side assemblies are in a vertical position, said front stop clears the ground, but when the side assembly can move forward a selected amount, the stop will prevent further forward rotation.

10. A collapsible cart which comprises:

(a) At least a first shelf and a second shelf;

(b) A pair of spaced apart wheels each rotatable about an axis;

(c) A pair of spaced apart casters each rotatable about an axis;

(d) Means supporting said pair of wheels and said pair of casters in a fixed spaced relationship;

(e) A pivot supported by said support means;

(f) A first and a second side shelf support assembly, each assembly having at least two parallel shelf support bars, each bar at a lower end supported from and rotatable about said pivot;

(g) Each side of each shelf pivotally supported from one of said parallel shelf support bars such that as each support bar rotates about a respective pivot, said shelves move closer together while remaining parallel to each other and parallel to a plane defined by the axis of each said wheel and the axis of each said caster;

(h) A front stop supported from one of said shelf support bars such that when said side assemblies are in a vertical position said front stops clear the ground, but when the side assemblies move forward a selected amount, the stop will prevent further rotation.

\* \* \* \* \*